US011719222B2

(12) United States Patent
Broome (10) Patent No.: US 11,719,222 B2
(45) Date of Patent: Aug. 8, 2023

(54) METHOD OF JOINING WIND TURBINE ROTOR BLADE SEGMENTS VIA STRUCTURAL MEMBERS

(71) Applicant: General Electric Company, Schenectady, NY (US)

(72) Inventor: Peter Anthony Broome, Park Ridge, IL (US)

(73) Assignee: General Electric Company, Schenectady, NY (US)

(*) Notice: Subject to any disclaimer, the term of this patent is extended or adjusted under 35 U.S.C. 154(b) by 477 days.

(21) Appl. No.: 16/054,355

(22) Filed: Aug. 3, 2018

(65) Prior Publication Data

US 2020/0040868 A1 Feb. 6, 2020

(51) Int. Cl.
*F03D 1/06* (2006.01)
*F03D 13/10* (2016.01)

(52) U.S. Cl.
CPC ........... *F03D 1/0675* (2013.01); *F03D 13/10* (2016.05); *F05B 2230/60* (2013.01); *F05B 2240/302* (2013.01)

(58) Field of Classification Search
CPC ............ F05B 2230/60; F05B 2240/302; F05B 2240/57; F05B 2230/23; F03D 1/0675; F03D 13/10; B29D 99/0025; Y02P 70/523; Y02E 10/721
See application file for complete search history.

(56) References Cited

U.S. PATENT DOCUMENTS

| 7,922,454 B1* | 4/2011 | Riddell ................. F03D 1/0675 416/224 |
| 7,997,874 B2 | 8/2011 | van der Bos |
| 7,998,303 B2* | 8/2011 | Baehmann ............ F03D 1/0675 156/293 |
| 8,075,275 B2 | 12/2011 | Althoff et al. |
| 8,167,569 B2* | 5/2012 | Livingston ............ F03D 1/0675 416/224 |

(Continued)

FOREIGN PATENT DOCUMENTS

| EP | 2749765 A1 * | 7/2014 | ......... B29D 99/0025 |
| EP | 2749765 A1 | 7/2014 | |

OTHER PUBLICATIONS

PCT International Search Report Corresponding to PCT/US2019/044349 dated Jan. 14, 2020.
U.S. Appl. No. 15/437,776, filed Feb. 21, 2017.

*Primary Examiner* — Brian Christopher Delrue
(74) *Attorney, Agent, or Firm* — Dority & Manning, P.A.

(57) ABSTRACT

A method for joining rotor blade segments of a rotor blade includes forming a female structural member having a receipt portion with a cavity and a structural portion. Further, the method includes securing the female structural member within a first blade segment. The method also includes forming a male structural member having a protrusion portion and a structural portion. Moreover, the method includes securing the structural portion of the male structural member within a second blade segment. In addition, the method includes inserting the protrusion portion into the cavity. As such, when inserted, an interface of the protrusion portion and the cavity forms one or more internal channels. Thus, the method further includes injecting adhesive into the one or more internal channels so as to secure the first and second blade segments together.

19 Claims, 10 Drawing Sheets

(56) References Cited

U.S. PATENT DOCUMENTS

| | | | |
|---|---|---|---|
| 8,172,539 B2 | 5/2012 | Kootstra | |
| 8,221,085 B2 * | 7/2012 | Livingston | B29C 65/54 156/291 |
| 8,240,962 B2 | 8/2012 | Livingston et al. | |
| 8,409,381 B2 * | 4/2013 | Ramm | F03D 1/0675 156/125 |
| 8,517,689 B2 | 8/2013 | Kyriakides et al. | |
| 8,918,997 B2 | 12/2014 | Kyriakides et al. | |
| 9,555,588 B2 * | 1/2017 | Hayden | B29C 70/222 |
| 9,617,973 B2 * | 4/2017 | Stege | B29D 99/0025 |
| 9,790,919 B2 * | 10/2017 | Leonard | F03D 1/0675 |
| 2007/0253824 A1 * | 11/2007 | Eyb | F03D 1/0675 416/223 R |
| 2009/0116962 A1 | 5/2009 | Pedersen et al. | |
| 2009/0155084 A1 | 6/2009 | Livingston et al. | |
| 2010/0310379 A1 | 12/2010 | Livingston | |
| 2012/0141287 A1 | 6/2012 | Hynum et al. | |
| 2012/0269643 A1 | 10/2012 | Hibbard et al. | |
| 2014/0169978 A1 * | 6/2014 | Livingston | F03D 1/0675 416/226 |
| 2014/0186189 A1 | 7/2014 | Stege | |
| 2015/0110632 A1 * | 4/2015 | Rohden | F03D 1/0675 416/210 R |
| 2017/0122287 A1 * | 5/2017 | Dobbe | B29C 66/00145 |
| 2017/0363063 A1 * | 12/2017 | Yarbrough | F03D 9/25 |
| 2018/0051672 A1 | 2/2018 | Merzhaeuser et al. | |
| 2018/0266388 A1 * | 9/2018 | Hallissy | F03D 80/30 |
| 2019/0360457 A1 * | 11/2019 | Barton | F03D 1/0633 |

\* cited by examiner

METHOD OF JOINING WIND TURBINE ROTOR BLADE SEGMENTS VIA STRUCTURAL MEMBERS

FIELD

The present subject matter relates generally to wind turbines, and more particularly to segmented rotor blades for wind turbines and methods of joining same.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles and transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The construction of a modern rotor blade generally includes skin or shell components, opposing spar caps, and one or more shear webs extending between the opposing spar caps. The skin is typically manufactured from layers of fiber composite and a lightweight core material and forms the exterior aerodynamic airfoil shape of the rotor blade. Further, the spar caps provide increased rotor blade strength by providing structural elements along the span of the rotor blade on both interior sides of the rotor blade. Moreover, spar caps are typically constructed from glass fiber reinforced composites, though spar caps for some larger blades may be constructed from carbon fiber reinforced composites. The shear web(s) generally include structural beam-like components that extend essentially perpendicular between the opposing spar caps and across the interior portion of the rotor blade between the outer skins.

The size, shape, and/or weight of rotor blades are factors that contribute to energy efficiencies of wind turbines. An increase in rotor blade size increases the energy production of a wind turbine, while a decrease in weight also furthers the efficiency of a wind turbine. Furthermore, as the size of wind turbines increases, particularly the size of the rotor blades, so do the respective costs of manufacturing, transporting, and assembly of the wind turbines. The economic benefits of increased wind turbine sizes must be weighed against these factors.

One known strategy for reducing the costs of pre-forming, transporting, and erecting wind turbines having rotor blades of increasing sizes is to manufacture the rotor blades in blade segments. As such, the blade segments may be assembled to form the rotor blade after, for example, the individual blade segments are transported to an erection location. For example, some rotor blades include either bonded or bolted joints.

However, certain adhesive bonds provide additional challenges. For example, the internal consolidation pressure required to obtain an effective bond can be difficult to achieve and maintain during the bond process. Of particular concern is the internal consolidation pressure in areas of the turbine blade that are inaccessible. For instance, the portion of the rotor blade at the tip is often smaller and cannot be easily reached using conventional methods. The internal consolidation pressure necessary at these inaccessible areas is generally referred to as blind pressure. In addition, wet adhesives can be difficult to apply without air bubbles and/or may provide uneven coverage with slide-in assemblies. Additionally, adhesive squeeze-out can cause parasitic weight, undesirable spills, a subpar bond, and/or undesirable clean-up. Further, the ability to reposition the surfaces can be limited due to the risk of introducing air and/or air pockets in the adhesive.

As such, the art is continuously seeking new and improved joint technologies for joining blade segments of rotor blades. Accordingly, the present disclosure is directed to a rotor blade assembly that guides/self-aligns, controls accuracy, and simplifies the structural bond between two blade segments by the ability to dry-assemble the interlocking pieces and inject the adhesive in-situ.

BRIEF DESCRIPTION

Aspects and advantages of the invention will be set forth in part in the following description, or may be obvious from the description, or may be learned through practice of the invention.

In one aspect, the present disclosure is directed to a method for joining rotor blade segments of a rotor blade. The method includes forming a female structural member having a receipt portion and a structural portion, the receipt portion defining a cavity. Further, the method includes securing the female structural member within a first blade segment. The method also includes forming a male structural member having a protrusion portion and a structural portion. Moreover, the method includes securing the structural portion of the male structural member within a second blade segment. In addition, the method includes inserting the protrusion portion of the male structural member into the cavity of the female structural member. As such, when inserted, an interface of the protrusion portion of the male structural member and the cavity of the female structural member forms one or more internal channels. Thus, the method further includes injecting adhesive into the one or more internal channels so as to secure the first and second blade segments together.

In one embodiment, the method may further include forming either or both of the female structural member or the male structural member with one or more bulkheads. For example, in certain embodiments, the method may include forming the female structural member with a first end bulkhead and a second end bulkhead.

In additional embodiments, the female and male structural members may each include a divider bulkhead positioned between the receipt portion and the structural portion of the female structural member and the protrusion portion and the structural portion of the male structural member, respectively. In such embodiments, the method may include inserting the protrusion portion of the male structural member into the cavity of the female structural member until the divider bulkhead of the male structural member abuts against the first end bulkhead of the female structural member at a bulkhead joint. In further embodiments, the bulkhead(s) may be sized to abut against an internal wall of one of the rotor blade segments of the rotor blade.

In several embodiments, the method may include injecting the adhesive into the one or more internal channels from an exterior location of the rotor blade through the one or more bulkheads. In such embodiments, the method may also include filling the one or more internal channels with the adhesive and allowing the adhesive to fill the bulkhead joint via one or more controlled blow holes.

In further embodiments, the structural portions of the female and male structural members may include one or more spar caps and/or at least one shear web. In such embodiments, the method may include forming one or more spar caps into the cavity and the protrusion portion of the female and male structural members, respectively. As such, when the protrusion portion is inserted into the cavity, the spar cap(s) of the cavity and the spar cap(s) of the protrusion portion are configured to align in a span-wise direction.

In another aspect, the present disclosure is directed to a segmented rotor blade assembly for a wind turbine. The rotor blade assembly includes a first blade segment comprising a female structural member having a receipt portion and a structural portion. The receipt portion defines a cavity. The rotor blade assembly also includes a second blade segment having a male structural member with a protrusion portion and a structural portion. The protrusion portion of the male structural member is received within the cavity of the female structural member. Further, when inserted, an interface of the protrusion portion of the male structural member and the cavity of the female structural member forms one or more internal channels. The rotor blade assembly further includes an adhesive within and limited to the one or more internal channels that secures the first and second blade segments together. It should be understood that the rotor blade assembly may further include any of the additional features described herein.

In addition, in one embodiment, a cross-sectional shape of the cavity of the female structural member substantially corresponds to a cross-sectional shape of the protrusion portion of the male structural member. In another embodiment, the cross-sectional shapes of the cavity and the protrusion portion tapers from a first end to a second end, respectively. More specifically, in particular embodiments, the cross-sectional shapes of the cavity and the protrusion portion may be a trapezoid.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a segmented rotor blade for a wind turbine and methods of joining same. For example, in one embodiment, the method includes forming a female structural member having a receipt portion with a cavity and a structural portion. Further, the method includes securing the female structural member within a first blade segment. The method also includes forming a male structural member having a protrusion portion and a structural portion. Moreover, the method includes securing the structural portion of the male structural member within a second blade segment. In addition, the method includes inserting the protrusion portion into the cavity. As such, when inserted, an interface of the protrusion portion and the cavity forms one or more internal channels. Thus, the method further includes injecting adhesive into the one or more internal channels so as to secure the first and second blade segments together. Accordingly, a critical blind bond in the joint connection is avoided by having a secondary structure (i.e. the female and male structural members) bonded onto a primary structure (i.e. the first and second blade segments) where the continuation of the stress member is paramount.

The present disclosure provides many advantages not present in the prior art. For example, the method of the present disclosure provides a closed and controlled adhesive layer gap to be fed externally via channel(s) at the interface of the female and male structural members (e.g. boxes). Further, the male and female boxes may also provide fibrous composite and adhesion to the ends of the spar beam connection that is prone to strain to first crack of peel degradation, i.e. an anti-peel layer. In addition, the entire bonding operation is completed blind or within an internal structure or cavity. As such, the containment of the bonded area eliminates spill and/or parasitic weight of the rotor blade. Accordingly, the final assembly provides a controlled and even stress path, limits the changes in the bending moment of the rotor blade, and lowers additional weight of other conventional methods.

Figure 1:
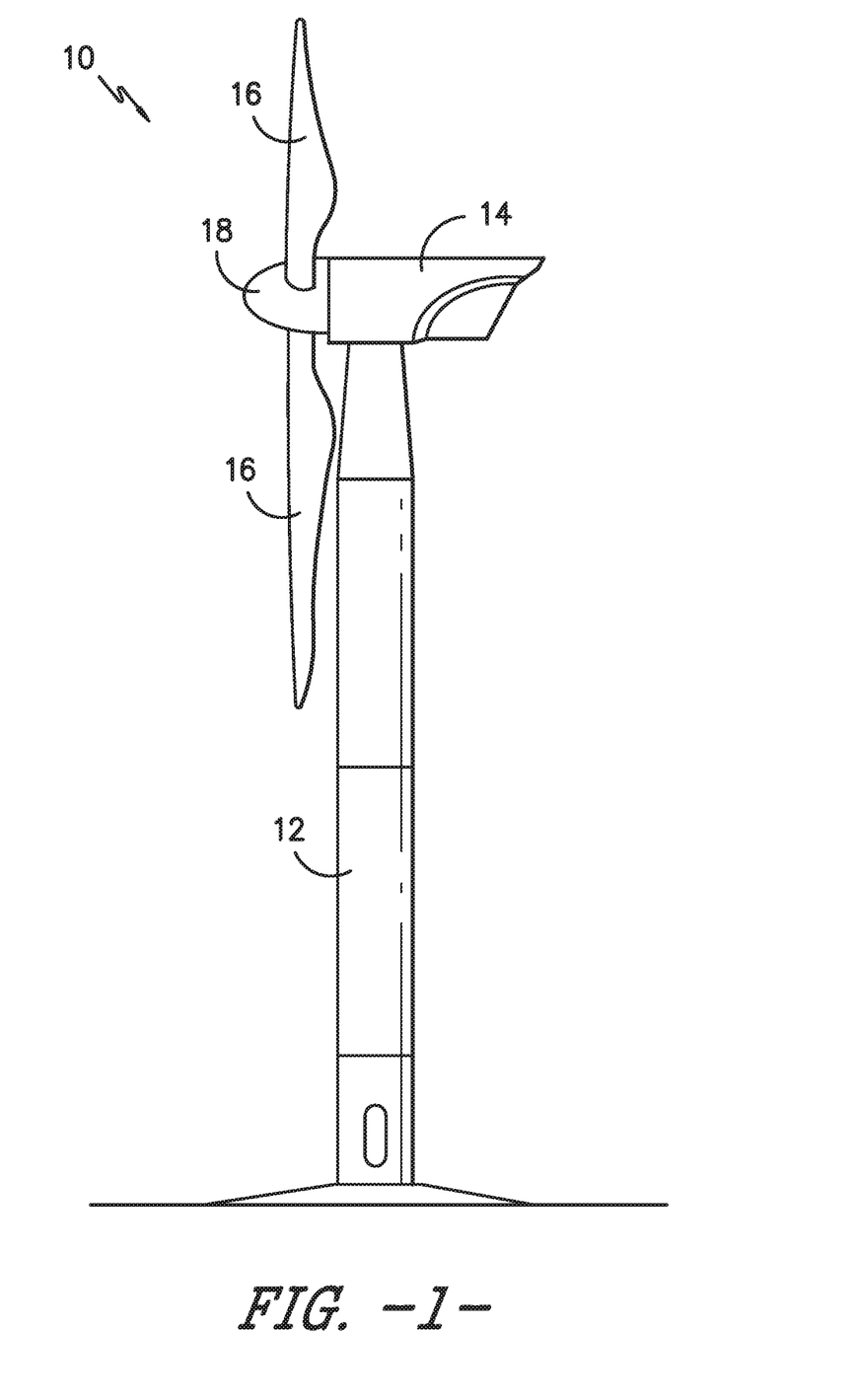
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
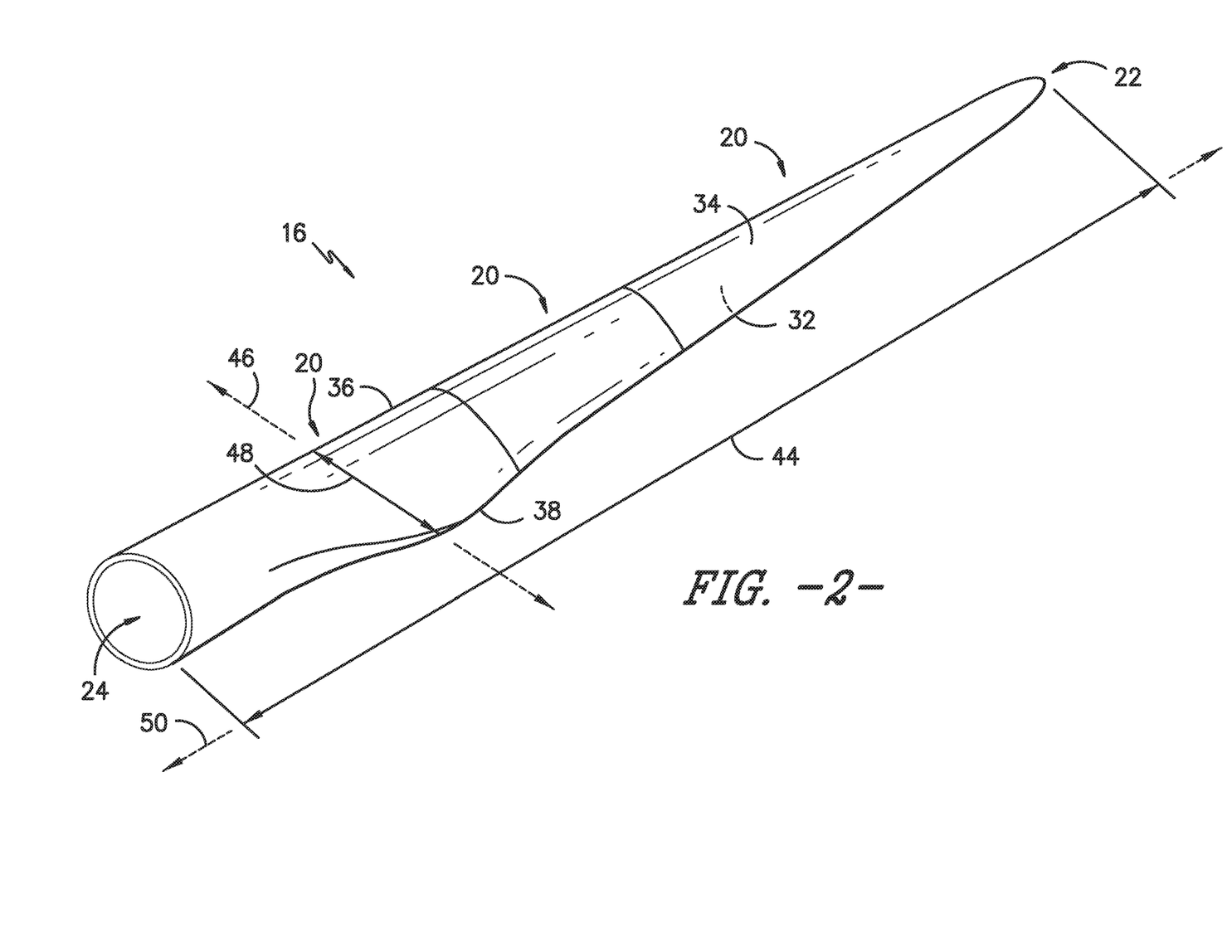
FIG. 2 illustrates a perspective view of one of the rotor blades of FIG. 1.

Referring now to FIG. 2, a perspective view of one embodiment of one of the rotor blades 16 of the wind turbine 10 of FIG. 1 according to the present disclosure is shown. As shown, the rotor blade 16 may include a plurality of individual blade segments 20 aligned in an end-to-end configuration from a blade tip 22 to a blade root 24. Further, as shown, each of the individual blade segments 20 may be uniquely configured so that the plurality of blade segments 20 define a complete rotor blade 16 having a designed aerodynamic profile, length, and other desired characteristics. For example, each of the blade segments 20 may have an aerodynamic contour that corresponds to the aerodynamic contour of adjacent blade segments 20. Thus, the aerodynamic contours of the blade segments 20 may form a continuous aerodynamic contour of the rotor blade 16. As such, the rotor blade 16 may include any suitable number of segments 20. For example, as shown, the rotor blade 16 includes three rotor blade segments 20. It should be understood, however, that the rotor blade 16 may have any suitable number of blade segments 20, such as less than three or more than three, such as four or more.

In general, the rotor blade 16, and thus each blade segment 20, may include a pressure side 32 and a suction side 34 extending between a leading edge 36 and a trailing edge 38. Additionally, the rotor blade 16 may have a span 44 extending along a span-wise axis 46 and a chord 48 extending along a chord-wise axis 50. Further, as shown, the chord 48 may change throughout the span 44 of the rotor blade 16. Thus, a local chord may be defined at any span-wise location on the rotor blade 16 or any blade segment 20 thereof.

The rotor blade 16 may, in exemplary embodiments, be curved. Curving of the rotor blade 16 may entail bending the rotor blade 16 in a generally flapwise direction and/or in a generally edgewise direction. The flapwise direction is a direction substantially perpendicular to a transverse axis through a cross-section of the widest side of the rotor blade 16. Alternatively, the flapwise direction may be construed as the direction (or the opposite direction) in which the aerodynamic lift acts on the rotor blade 16. The edgewise direction is perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

Figure 3:
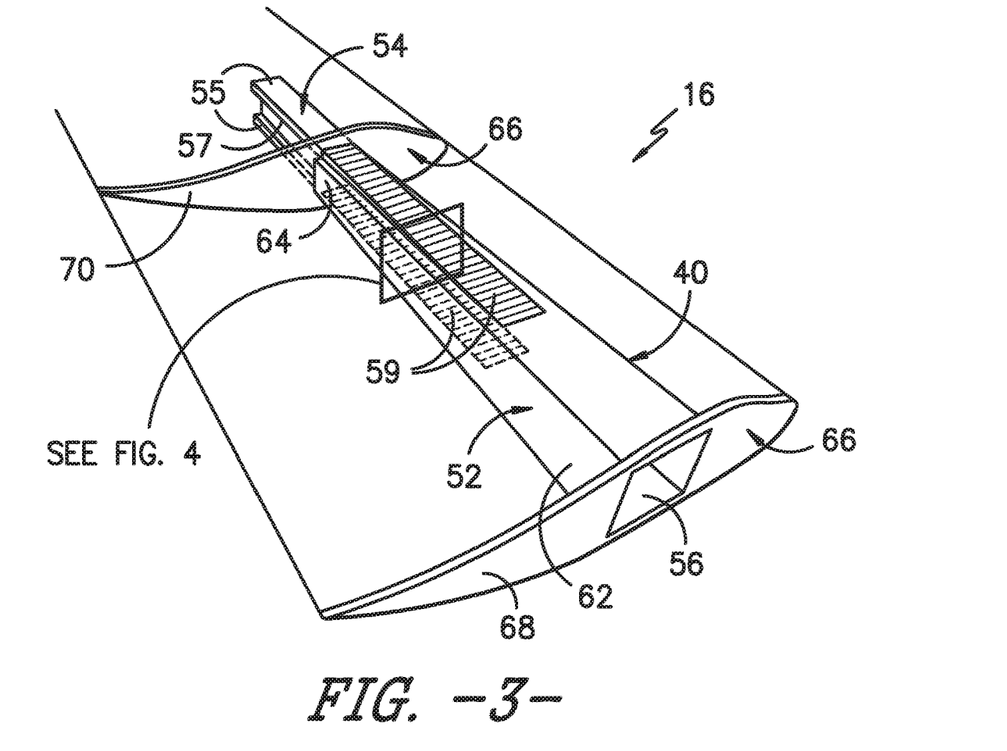
FIG. 3 illustrates a perspective view of one embodiment of female structural member secured to a rotor blade segment of a rotor blade assembly according to the present disclosure.
Figure 4:
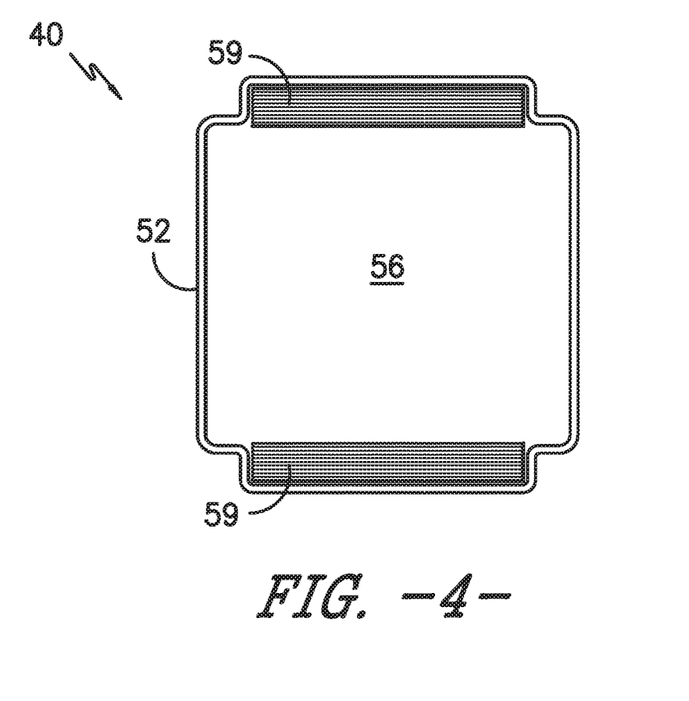
FIG. 4 illustrates a cross-sectional of one embodiment of female structural member of a rotor blade assembly according to the present disclosure.
Figure 5:
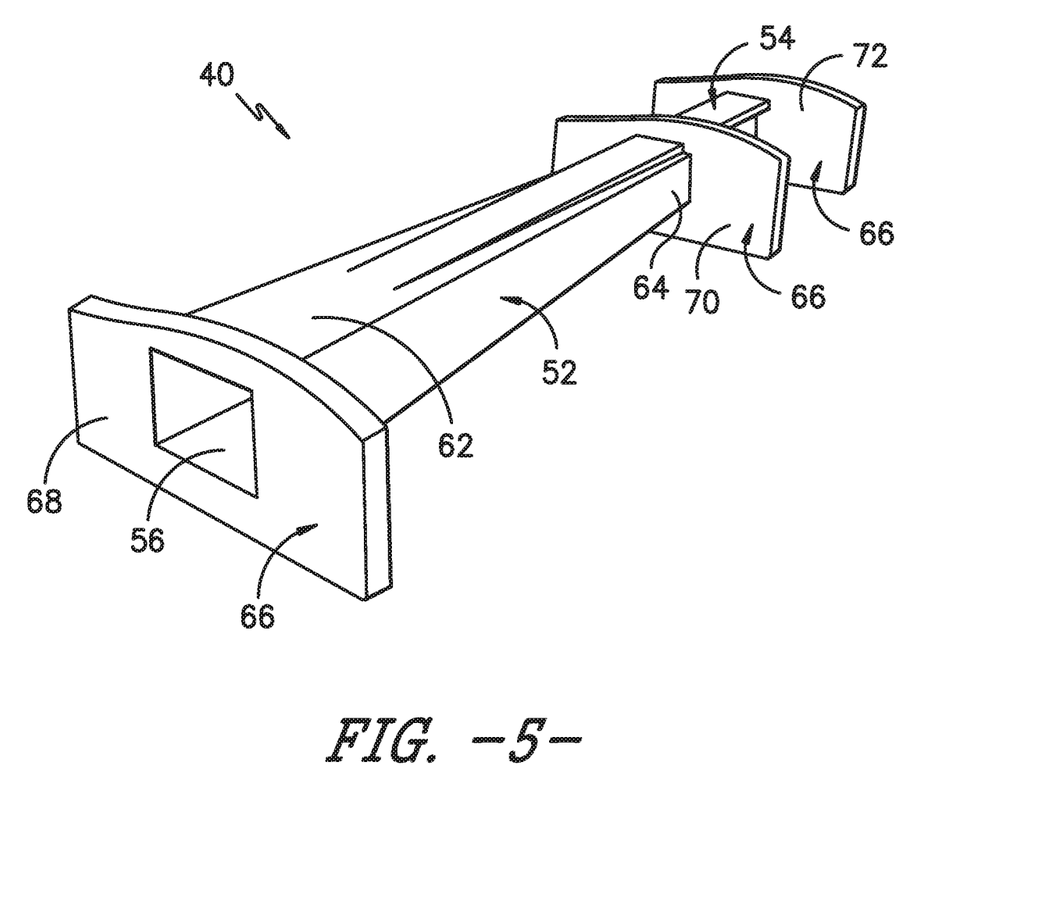
FIG. 5 illustrates a perspective view of one embodiment of female structural member of a rotor blade assembly according to the present disclosure.
Figure 6:
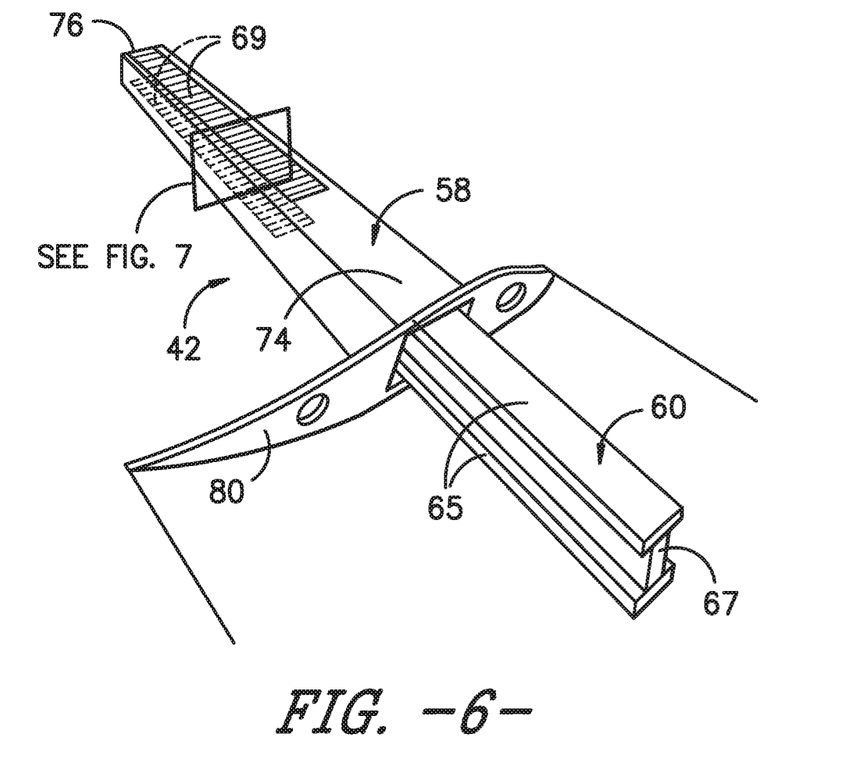
FIG. 6 illustrates a perspective view of one embodiment of male structural member secured to a rotor blade segment of a rotor blade assembly according to the present disclosure.
Figure 7:
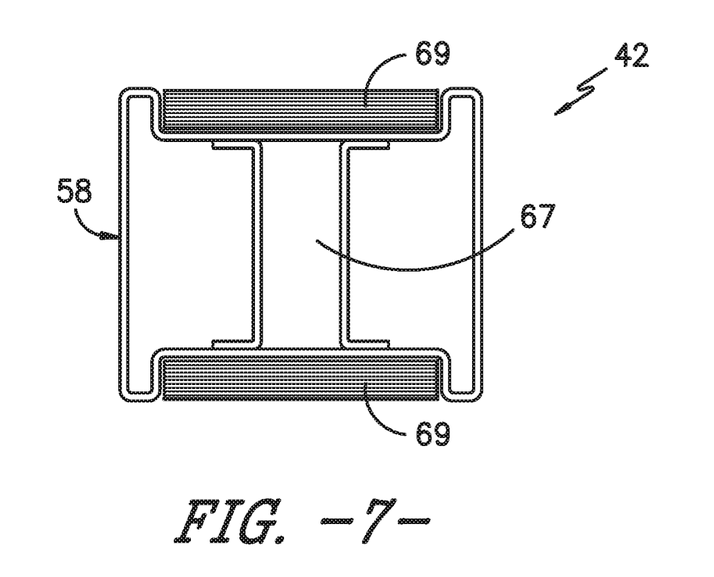
FIG. 7 illustrates a cross-sectional of one embodiment of male structural member of a rotor blade assembly according to the present disclosure.
Figure 8:
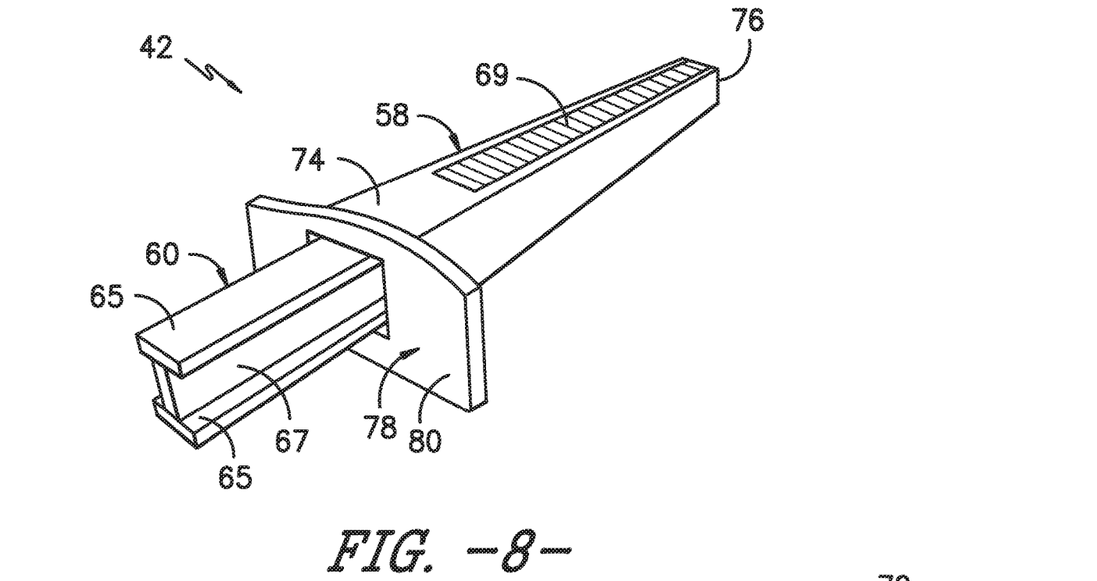
FIG. 8 illustrates a perspective view of another embodiment of male structural member of a rotor blade assembly according to the present disclosure.

Referring now to FIGS. 3-8, various views of the blade segment(s) 20 and components thereof according to the present disclosure are illustrated. In particular, FIG. 3 illustrates a perspective, internal view of one embodiment of a first blade segment 26 having a female structural member 40 secured therein. FIGS. 4 and 5 illustrate various views of the female structural member 40 according to the present disclosure. FIG. 6 illustrates a perspective, internal view of one embodiment of a second blade segment 28 having a male structural member 42 secured therein. FIGS. 7 and 8 illustrate various views of the male structural member 42 according to the present disclosure.

Referring particularly to FIGS. 3 and 5, the female structural member 40 may have a receipt portion 52 and a structural portion 54. Further, as shown, the receipt portion 52 defines a cavity 56 or box that is closed from all ends except its inlet, which is configured to receive the male structural member 42. For example, as shown particularly in FIGS. 3 and 5, the cross-sectional shape of the cavity 56 may taper from a first end 62 to a second end 64. More specifically, in particular embodiments, the cross-sectional shape of the cavity 56 may be a square, a rectangle, a trapezoid, or any other suitable cross-section shape. For example, as shown in FIG. 4, the cross-sectional shape of the cavity 56 may be a square.

Moreover, as shown, the structural portion 54 of the female structural member 40 may include one or more spar caps 55 and/or at least one shear web 57 arranged between the spar caps 55. In addition, as shown, the cavity 56 of the female structural member 40 may also include one or more spar caps 59 formed into a side wall thereof. Thus, as shown, the spar caps 55 of the structural portion 54 and the spar caps 59 of the cavity are substantially aligned in a span-wise direction to form a continuous spar cap.

In addition, as shown in FIGS. 3 and 5, the female structural member 40 may be formed with one or more bulkheads 66. For example, as shown in FIG. 3, the female structural member 40 may a first end bulkhead 68 and a divider bulkhead 70. More specifically, as shown, the divider bulkhead 70 may be positioned between the receipt portion 52 and the structural portion 54 of the female structural member 40. In addition, as shown in FIG. 5, the female structural member 40 may also include a second end bulkhead 72. It should be further understood that the female and male structural members 40, 42 may further includes any number of bulkheads at any suitable location along their lengths.

Figure 9:
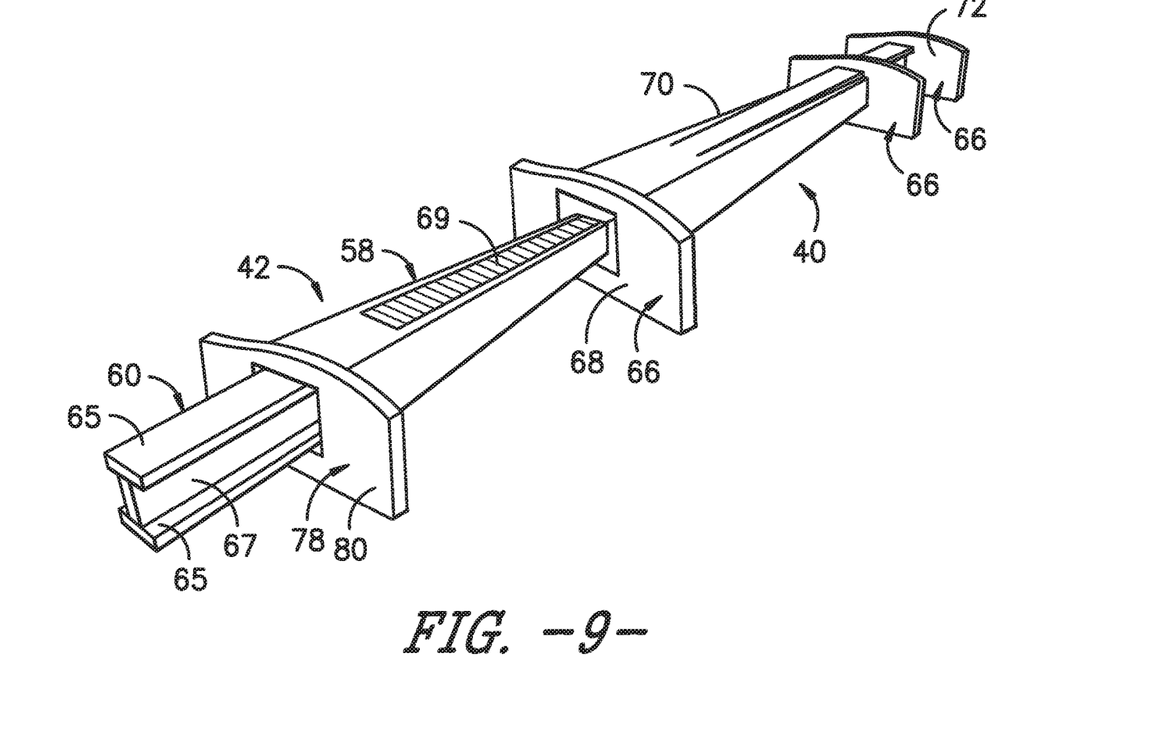
FIG. 9 illustrates a perspective view of one embodiment of male structural member as it is being inserted into a female structural member of a rotor blade assembly according to the present disclosure.
Figure 10:
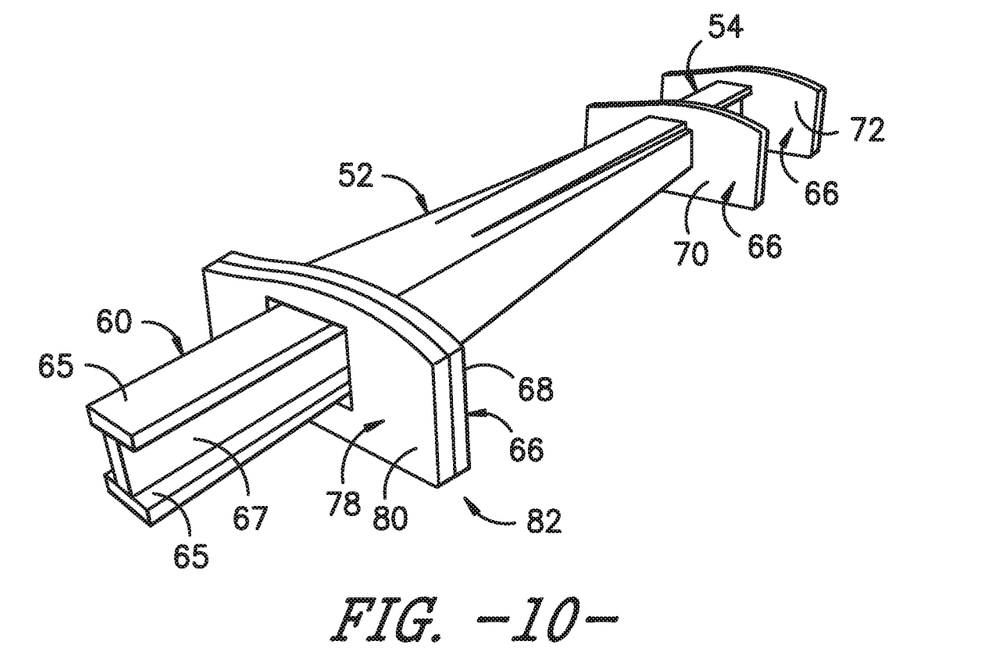
FIG. 10 illustrates a perspective view of one embodiment of male structural member inserted into a female structural member of a rotor blade assembly according to the present disclosure.
Figure 11:
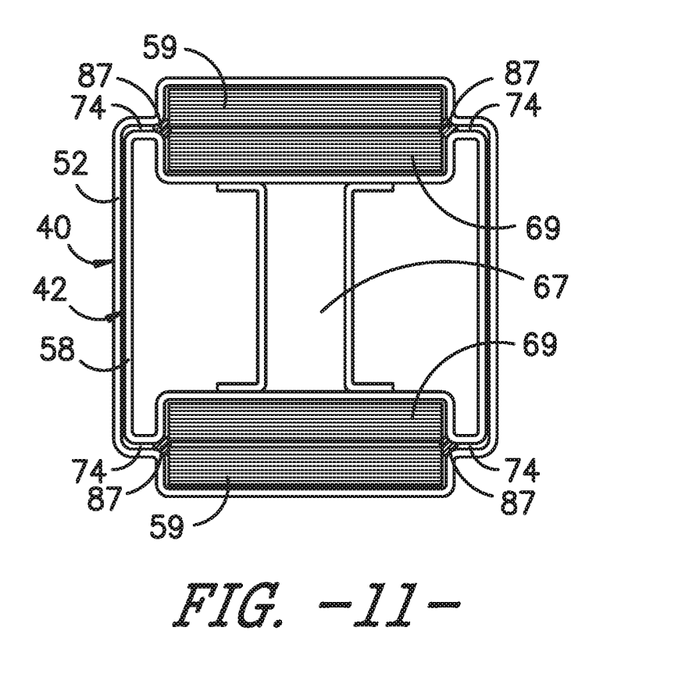
FIG. 11 illustrates a cross-sectional view of one embodiment of a joint of a rotor blade assembly according to the present disclosure.

Referring now to FIGS. 6 and 8, the male structural member 42 may include a protrusion portion 58 and a structural portion 60. Thus, as shown in FIGS. 9-11, the protrusion portion 58 of the male structural member 42 is sized to be received within the cavity 56 of the female structural member 40. In further embodiments, the structural portion 60 of the male structural member 42 may include one or more spar caps 65 and/or at least one shear web 67. In addition, the protrusion portion 58 of the male structural member 42 may also include one or more spar caps 69 formed therein. As such, when the protrusion portion 58 is inserted into the cavity 56, the spar cap(s) 59 of the cavity 56 and the spar cap(s) 69 of the protrusion portion 58 are configured to align in a span-wise direction. In addition, as shown, a cross-sectional shape of the cavity 56 of the female structural member 40 substantially corresponds to a cross-sectional shape of the protrusion portion 58 of the male structural member 42 such that the protrusion portion 58 fits easily within the cavity 56, e.g. via a dry fit. For example, as shown particularly in FIGS. 6 and 8, the cross-sectional shape of the protrusion portion 58 may taper from a first end 74 to a second end 76. More specifically, in particular embodiments, the cross-sectional shape of the protrusion portion 58 may be a square, a rectangle, a trapezoid, or any other suitable cross-section shape. For example, as shown in FIG. 7, the cross-sectional shape of the protrusion portion 58 may be a square.

Like the female structural member 40, the male structural member 42 may also include one or more bulkheads 78. For example, as shown particularly in FIGS. 6 and 8, the male structural member 42 may also include a divider bulkhead 80 positioned between the protrusion portion 58 and the structural portion 60 of the male structural member 42. Thus, as shown in FIGS. 9-11, the protrusion portion 58 of the male structural member 42 can be inserted into the cavity 56 of the female structural member 40, e.g. until the divider bulkhead 80 of the male structural member 42 abuts against the first end bulkhead 68 of the female structural member 40 at a bulkhead joint 82. In addition, in further embodiments, the bulkhead(s) 66, 78 described herein may be sized to abut against an internal wall of one of the rotor blade segments 26, 28 of the rotor blade 16.

Figure 12:
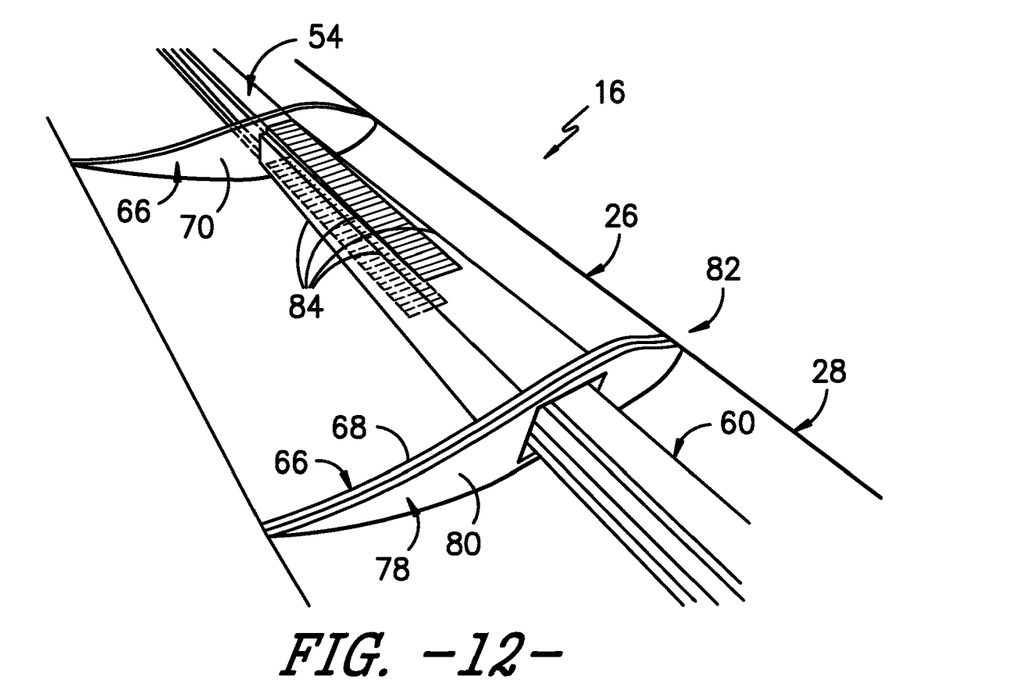
FIG. 12 illustrates a schematic view of one embodiment of an initial step of a bonding process for joining rotor blade segments of a rotor blade according to the present disclosure.

Referring now to FIGS. 11 and 12, when the protrusion portion 58 of the male structural member 42 is inserted into the cavity 56 of the female structural member 40, one or more internal channels 84 are formed at an interface between the structural members 40. In addition, as shown particularly in FIG. 11, one or more adhesive injection channels 87 are formed when the female and male structural members 40, 42 are formed.

Figure 13:
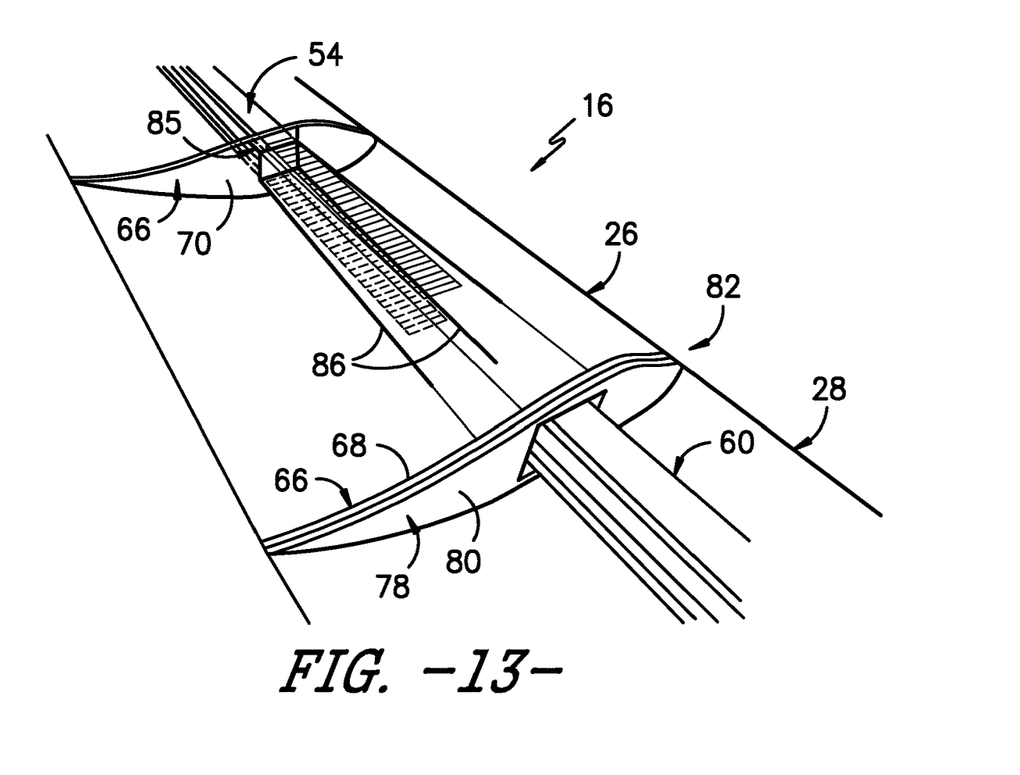
FIG. 13 illustrates a schematic view of one embodiment of another step of a bonding process for joining rotor blade segments of a rotor blade according to the present disclosure.
Figure 14:
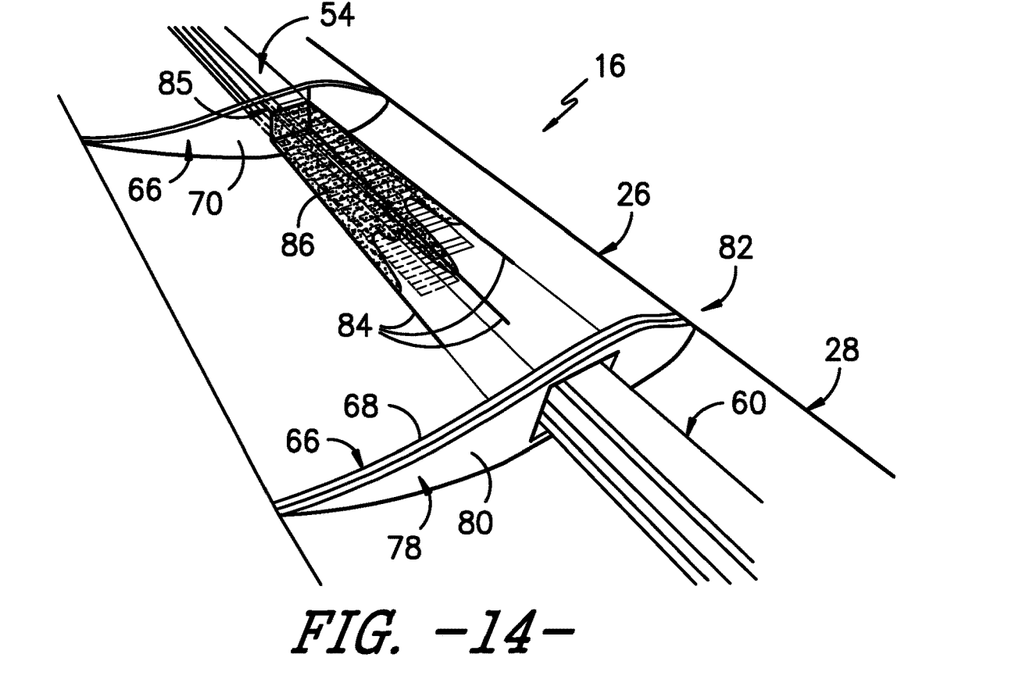
FIG. 14 illustrates a schematic view of one embodiment of yet another step of a bonding process for joining rotor blade segments of a rotor blade according to the present disclosure.
Figure 15:
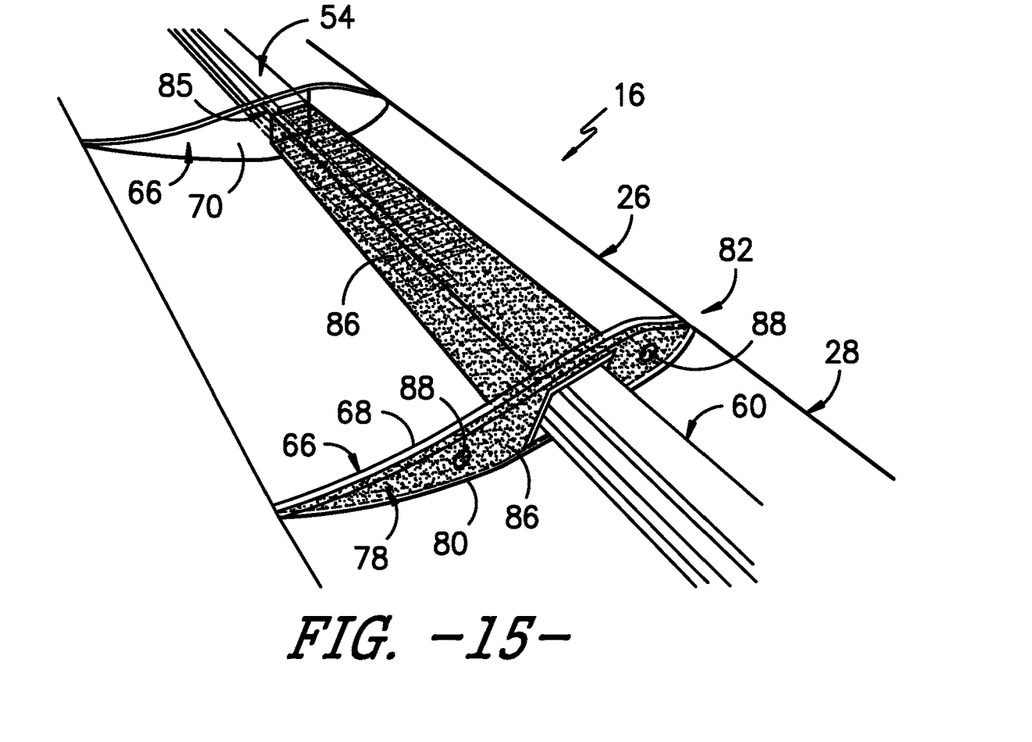
FIG. 15 illustrates a schematic view of one embodiment of still another step of a bonding process for joining rotor blade segments of a rotor blade according to the present disclosure.

Thus, once the protrusion portion 58 of the male structural member 42 is inserted into the cavity 56 of the female structural member 40, the first and second blade segments 26, 28 can be secured together by injecting an adhesive 86 into the one or more internal channels 84, as shown at FIG. 13. For example, as shown particularly in FIG. 13, the adhesive 86 may be injected from an exterior location of the rotor blade 16 through the divider bulkhead 70 of the female structural member 40. Thus, as shown in FIG. 14, the adhesive 86 flows through and fills the internal channel(s) 84 and is limited by the channel(s) 84 (i.e. the adhesive 86 does not overflow to other areas of the rotor blade 16). Further, as shown in FIG. 15, the adhesive 86 can also fill the bulkhead joint 82 via one or more controlled blow holes 88 so as to further secure the joint together.

Figure 16:
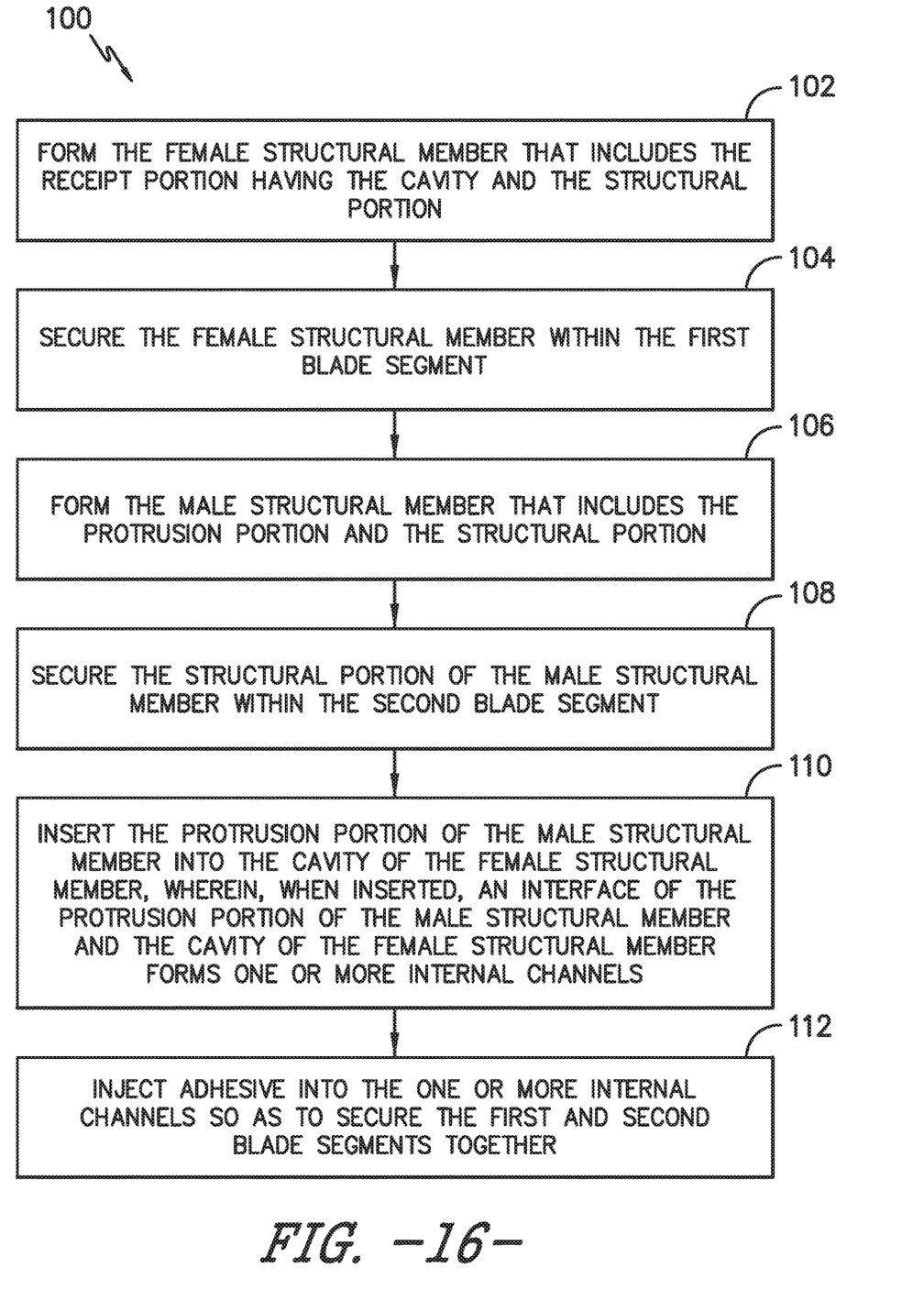
FIG. 16 illustrates a flow diagram of one embodiment of a method for joining rotor blade segments of a rotor blade according to the present disclosure.

Referring now to FIG. 16, a flow diagram of one embodiment of a method 100 for joining rotor blade segments 20 of the rotor blade 16 is illustrated. In general, the method 100 will be described herein with reference to the wind turbine 10 and rotor blade 16 shown in FIGS. 1-15. However, it should be appreciated that the disclosed method 100 may be implemented with any wind turbine having any other suitable configurations. In addition, although FIG. 16 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 102, the method 100 includes forming the female structural member 40 that includes the receipt portion 52 defining internal cavity 56 and the structural portion 54. For example, in one embodiment, the female structural member 40 may be formed using any suitable manufacturing methods and materials, including but not limited to injection molding, 3-D printing, 2-D pultrusion, 3-D pultrusion, thermoforming, vacuum forming, pressure forming, bladder forming, and/or vacuum infusion. Suitable materials may include, for example, thermoplastic and/or thermoset materials optionally reinforced with one or more fiber materials and/or pultrusions.

As shown at 104, the method 100 further includes securing the female structural member 40 within the first blade segment 26. For example, in one embodiment, the female structural member 40 may be secured to the first blade segment 26 via bonding, welding, and/or mechanical fasteners. As shown at 106, the method 100 also includes forming the male structural member 42 that includes the protrusion portion 58 and the structural portion 60. For example, like the female structural member 40 embodiment, the male structural member 42 may be formed using any suitable manufacturing methods and materials, including but not limited to injection molding, 3-D printing, 2-D pultrusion, 3-D pultrusion, thermoforming, vacuum forming, pressure forming, bladder forming, and/or vacuum infusion. In addition, as mentioned, suitable materials may include, for example, thermoplastic and/or thermoset materials optionally reinforced with one or more fiber materials and/or pultrusions.

Still referring to FIG. 13, as shown at 108, the method 100 includes securing the structural portion 60 of the male structural member 42 within the second blade segment 28. For example, in one embodiment, the male structural member 42 may be secured to the second blade segment 28 via bonding, welding, and/or mechanical fasteners. As shown at 110, the method 100 also includes inserting the protrusion portion 58 of the male structural member 42 into the cavity 56 of the female structural member 40. As such, when inserted, an interface of the protrusion portion 58 of the male structural member 42 and the cavity 56 of the female structural member 40 forms one or more internal channels 84. Thus, as shown at 112, the method 100 further includes injecting the adhesive 86 into the internal channel(s) 84 so as to secure the first and second blade segments 26, 28 together. In addition, the female and/or male structural members 40, 42 may also include internal and/or external electronic and/or non-electronic elements embedded therein so as to assist with curing the adhesives described herein. As such, the female and male structural members 40, 42 may be joined via heat (electronically or conductively-induced), contact, or chemical cross-linking or curing.

Accordingly, the method 100 of the present disclosure provides a closed and controlled adhesive layer gap to be fed externally or internally via the internal channel(s) 84. In addition, the female and male structural members 40, 42 also provide fibrous composite and adhesion to the ends of the spar beam connection prone to strain to first crack of peel degradation, i.e. an anti-peel layer. Further, as illustrated in the various figures, the entire bonding operation can be done blind or within the internal structure/cavity 56, thereby eliminating spills and/or parasitic weight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for joining rotor blade segments of a rotor blade, the method comprising:
    forming a female structural member having a receipt portion, a structural portion, and a divider bulkhead, the receipt portion defining a cavity having a taper and comprising one or more spar caps of the cavity, the divider bulkhead being positioned between the receipt portion and the structural portion, the structural portion comprising one or more spar caps, and the one or more spar caps of the cavity and the one or more spar caps of the structural portion aligned in a span-wise direction and forming one or more continuous spar caps;
    securing the female structural member within a first blade segment;
    forming a male structural member having a protrusion portion and a structural portion, the protrusion portion comprising one or more spar caps;
    securing the structural portion of the male structural member within a second blade segment;
    inserting the protrusion portion of the male structural member into the cavity of the female structural member, wherein, when inserted, an interface of the protrusion portion of the male structural member and the cavity of the female structural member forms a plurality of internal channels, and wherein, when inserted, the one or more continuous spar caps of the female structural member and the one or more spar caps of the protrusion portion of the male structural member align in a span-wise direction;
    injecting adhesive from an exterior location of the rotor blade through the divider bulkhead of the female structural member and into the plurality of internal channels at the interface of the protrusion portion of the male structural member and the cavity of the female structural member;
    and allowing the adhesive to cure within the plurality of internal channels so as to secure the first and second blade segments together;
    wherein the cross-sectional shapes of the cavity and the protrusion portion tapers from a first end to a second end, respectively; and
    wherein the female structural portion having one or more spar caps extends directly from an outer surface of the taper of the cavity.

2. The method of claim 1, further comprising forming at least one of the female structural member or the male structural member with one or more bulkheads.

3. The method of claim 2, further comprising forming the female structural member with a first end bulkhead and a second end bulkhead.

4. The method of claim 3, wherein the female and male structural members each comprises a divider bulkhead positioned between the receipt portion and the structural portion of the female structural member and the protrusion portion and the structural portion of the male structural member, respectively.

5. The method of claim 4, further comprising inserting the protrusion portion of the male structural member into the cavity of the female structural member until the divider bulkhead of the male structural member abuts against the first end bulkhead of the female structural member at a bulkhead joint.

6. The method of claim 2, wherein the one or more bulkheads are sized to abut against an internal wall of one of the rotor blade segments of the rotor blade.

7. The method of claim 5, further comprising injecting the adhesive into the plurality of internal channels from an exterior location of the rotor blade through the one or more bulkheads.

8. The method of claim 7, further comprising filling a plurality of internal channels with the adhesive and allowing the adhesive to fill the bulkhead joint via one or more controlled blow holes.

9. The method of claim 1, wherein the structural portion of the female structural member comprises at least one shear web.

10. The method of claim 1, further comprising forming one or more spar caps into each of the cavity and the protrusion portion of the female and male structural members, respectively, wherein, when the protrusion portion is inserted into the cavity, the one or more spar caps of the cavity and the one or more spar caps of the protrusion portion align in a span-wise direction.

11. A segmented rotor blade assembly for a wind turbine, the rotor blade assembly comprising:
    a first blade segment comprising a female structural member having a receipt portion, a structural portion, and a divider bulkhead, the receipt portion defining a cavity having a taper and comprising one or more spar caps of the cavity, the divider bulkhead being positioned between the receipt portion and the structural portion, the structural portion comprising one or more spar caps, and the one or more spar caps of the cavity and the one or more spar caps of the structural portion aligned in a span-wise direction and forming one or more continuous spar caps of the female structural member;
    a second blade segment comprising a male structural member having a protrusion portion and a structural portion, the protrusion portion comprising one or more spar caps, the protrusion portion of the male structural member-received within the cavity of the female structural member, wherein, when inserted, an interface of the protrusion portion of the male structural member and the cavity of the female structural member forms a plurality of internal channels, and wherein, when inserted, the one or more continuous spar caps of the female structural member and the one or more spar caps of the protrusion portion of the male structural member align in a span-wise direction; and an adhesive extending from an exterior location of the rotor blade through the divider bulkhead of the female structural member and within and limited to the plurality of internal channels, at the interface of the protrusion portion of the male structural member and the cavity of the female structural member, for securing the first and second blade segments together;

wherein the cross-sectional shapes of the cavity and the protrusion portion tapers from a first end to a second end, respectively; and wherein the female structural portion having one or more spar caps extends directly from an outer surface of the taper of the cavity.

12. The rotor blade assembly of claim 11, wherein at least one of the female structural member or the male structural member comprises one or more bulkheads, the female structural member comprising, at least, a first end bulkhead and a second end bulkhead.

13. The rotor blade assembly of claim 12, wherein the female and male structural members each comprises a divider bulkhead positioned between the receipt portion and the structural portion of the female structural member and the protrusion portion and the structural portion of the male structural member, respectively, the divider bulkhead of the male structural member abutting against the first end bulkhead of the female structural member at a bulkhead joint.

14. The rotor blade assembly of claim 12, wherein the one or more bulkheads abut against an internal wall of one of the rotor blade segments of the rotor blade.

15. The rotor blade assembly of claim 14, wherein one or more of the bulkheads comprises at least one exterior injection port configured to receive the adhesive, the at least one exterior injection port providing an adhesive path to the plurality of internal channels.

16. The rotor blade assembly of claim 11, wherein the structural portion of the female structural member comprises at least one shear web.

17. The rotor blade assembly of claim 11, wherein the cavity of the female structural member and the protrusion portion of the male structural member further comprises one or more spar caps, and wherein, when the protrusion portion is inserted into the cavity, the one or more spar caps of the cavity and the one or more spar caps of the protrusion portion align in a span-wise direction, the protrusion portion of the male structural member further comprising one or more shear webs arranged between the one or more spar caps thereof.

18. The rotor blade assembly of claim 11, wherein a cross-sectional shape of the cavity of the female structural member substantially corresponds to a cross-sectional shape of the protrusion portion of the male structural member.

19. The rotor blade assembly of claim 11, wherein the cross-sectional shapes of the cavity and the protrusion portion comprises a trapezoid.

\* \* \* \* \*